United States Patent
Kuo

(10) Patent No.: US 8,749,771 B1
(45) Date of Patent: Jun. 10, 2014

(54) APPARATUS FOR MEASURING THICKNESS OF LENS AND METHOD USING THE APPARATUS

(71) Applicant: Hon Hai Precision Industry Co., Ltd., New Taipei (TW)

(72) Inventor: Chang-Wei Kuo, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/725,799

(22) Filed: Dec. 21, 2012

(30) Foreign Application Priority Data

Dec. 17, 2012 (TW) .............................. 101147942 A

(51) Int. Cl.
*G01B 9/00* (2006.01)
*G03F 7/20* (2006.01)
*G01M 11/02* (2006.01)

(52) U.S. Cl.
CPC ........... *G03F 7/706* (2013.01); *G01M 11/0235* (2013.01)
USPC ................................ 356/124; 408/22; 451/42

(58) Field of Classification Search
CPC .... G03F 7/706; G01M 11/00; G01M 11/0235
USPC ............ 248/125.1; 356/375; 408/22; 451/42; 348/46; 355/67
See application file for complete search history.

(56) References Cited

U.S. PATENT DOCUMENTS

| | | | |
|---|---|---|---|
| 4,997,874 A * | 3/1991 | Asano et al. ................... | 524/503 |
| 6,623,339 B1 * | 9/2003 | Igarashi et al. ................. | 451/42 |
| 2009/0067940 A1 * | 3/2009 | Arai et al. ........................ | 408/22 |
| 2010/0258688 A1 * | 10/2010 | Wang et al. ................. | 248/125.1 |
| 2013/0162777 A1 * | 6/2013 | Wu et al. .......................... | 348/46 |

* cited by examiner

*Primary Examiner* — Tarifur Chowdhury
*Assistant Examiner* — Md Rahman
(74) *Attorney, Agent, or Firm* — Novak Druce Connolly Bove + Quigg LLP

(57) ABSTRACT

An apparatus for measuring a thickness of a lens is disclosed. The apparatus includes a first support, a second support, a third support, a first positioning element, a second element and a measuring element. The lens is disposed on the third support. The first positioning element is fixed to the first support to press against a first face of the lens beforehand. The second positioning element is movably mounted to the second support. The second positioning element can move towards the lens to press against a second face of the lens. The measuring element calculates the thickness of the lens according to the moving distance of the second positioning element.

16 Claims, 4 Drawing Sheets

APPARATUS FOR MEASURING THICKNESS OF LENS AND METHOD USING THE APPARATUS

BACKGROUND

1. Technical Field

The disclosure generally relates to an apparatus, and more particularly, to an apparatus for measuring a thickness of a lens.

2. Description of Related Art

Nowadays LEDs (light emitting diodes) are applied widely in various applications. Generally, an LED may be used with a lens to adjust light distribution thereof. The lens has a light incident face for receiving light from the LED, and a light emergent face for radiating light out of the lens. The light incident face and the light emergent face are generally designed to have complicated, irregular shapes for obtaining desired light pattern. However, the complicated, irregular shapes of the light incident face and the light emergent face of the lens cause measuring the thickness of the lens being difficult.

What is needed, therefore, is an apparatus which can address the limitations described.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the various views.

DETAILED DESCRIPTION

Figure 1:
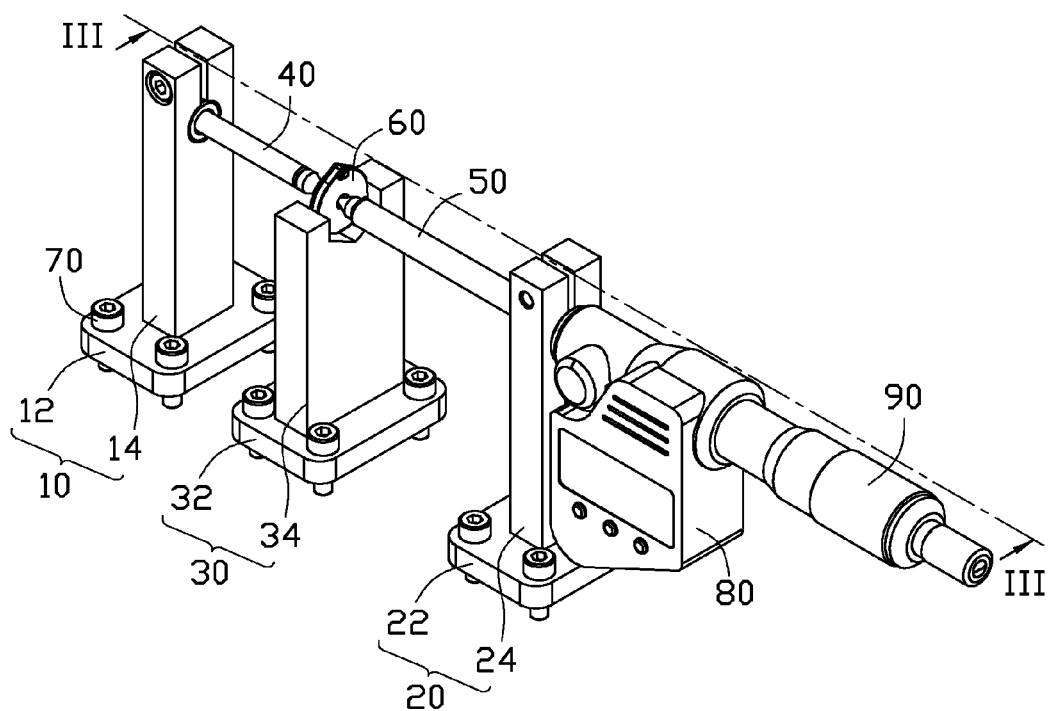
FIG. 1 is an isometric, assembled view of an apparatus in accordance with an embodiment of the present disclosure, wherein a lens is disposed on the apparatus.

Referring to FIG. 1, an apparatus for measuring a thickness of a lens 60 is shown. The apparatus includes a first support 10, a second support 20, a third support 30, a first positioning element 40, a second positioning element 50, a measuring device 80 and an operating element 90.

Figure 4:
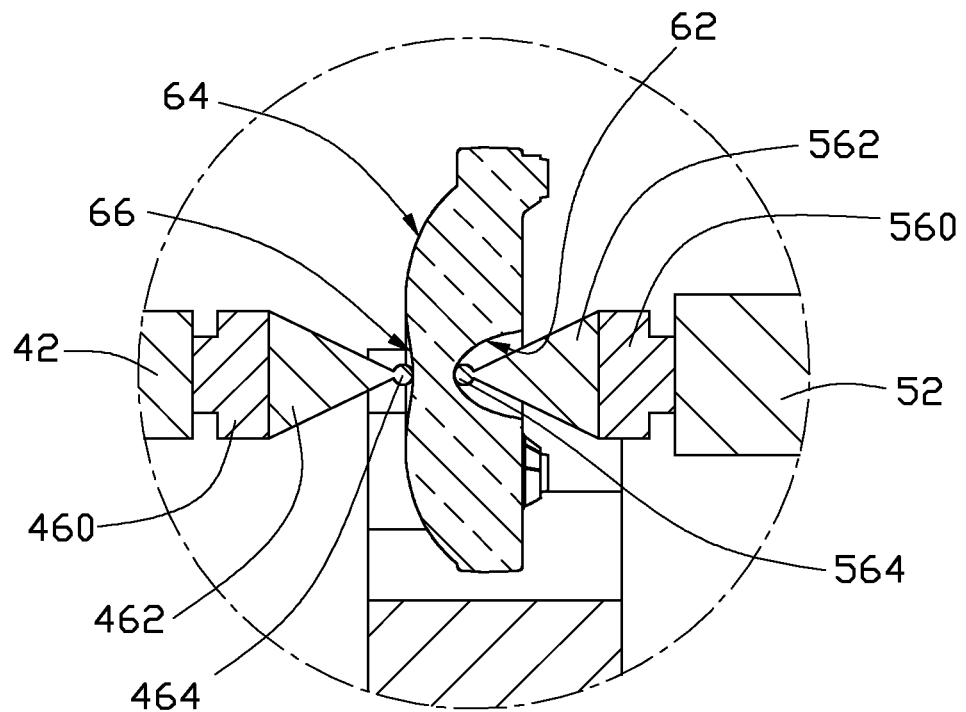
FIG. 4 is an enlarged view of a part IV of FIG. 3.

Also referring to FIG. 4, the lens 60 includes a light incident face 62 and a light emergent face 64 opposite to the light incident face 62. In this embodiment, the light incident face 62 is a concaved and curved face, and the light emergent face 64 is a convex and curved face with a depression 66 defined in a center thereof. The depression 66 is aligned with the light incident face 62.

Figure 2:
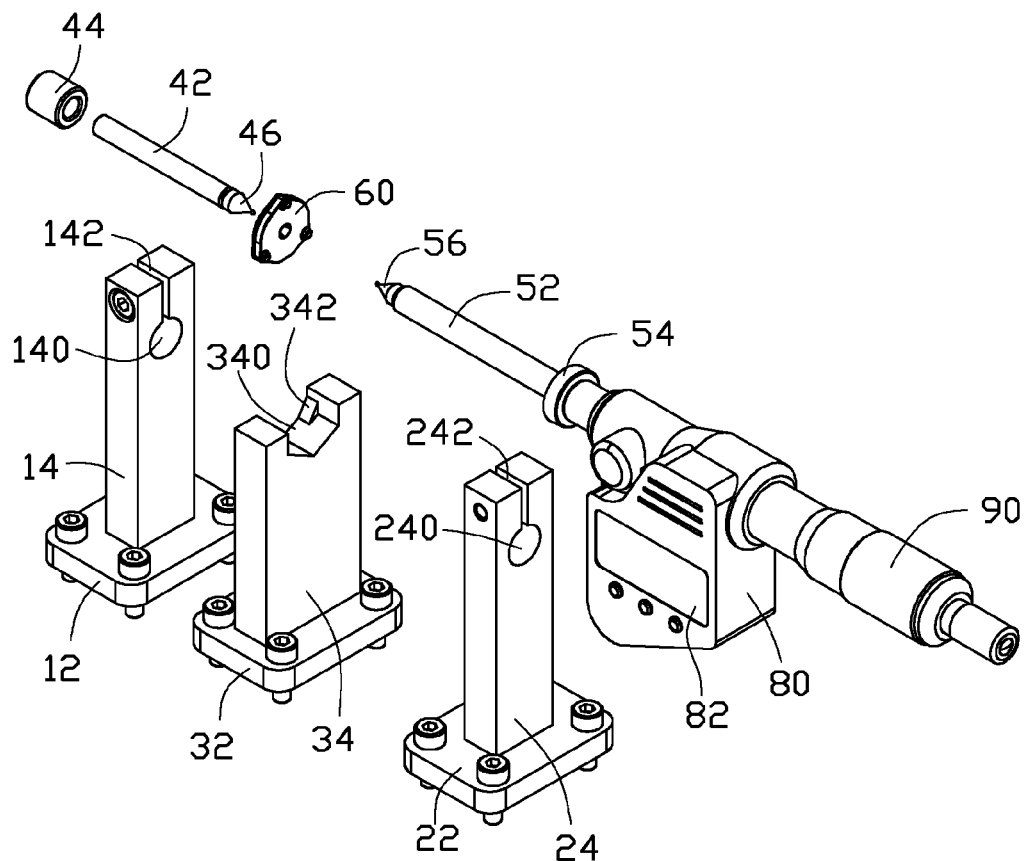
FIG. 2 is an exploded view of the apparatus of FIG. 1.
Figure 3:
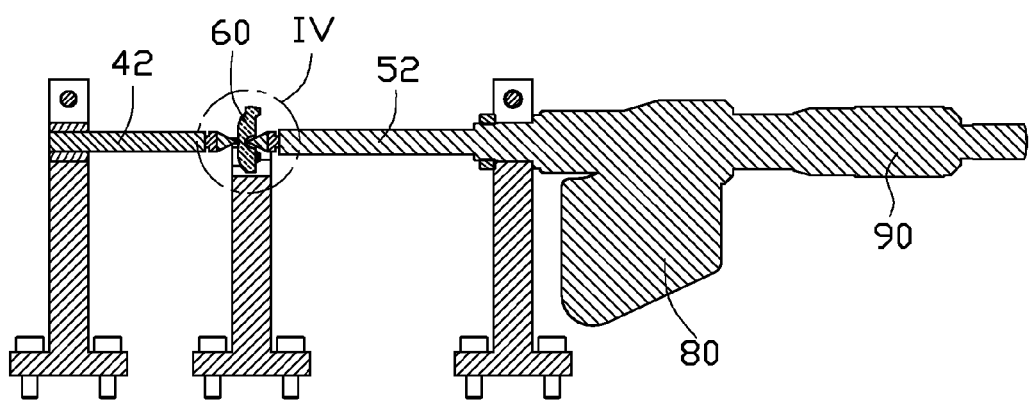
FIG. 3 is a cross section of the apparatus of FIG. 1, taken along line III-III thereof.

Also referring to FIGS. 2-3, the first support 10 and the second support 20 have the same configuration. Each of the first support 10 and the second support 20 includes a chassis 12, 22 and an arm 14, 24 extending upwardly from the chassis 12, 22. The chassis 12, 22 is fixed on a support (such as a table) via four screws 70. The arm 14, 24 defines a through hole 140, 240 adjacent to a top end thereof and a slot 142, 242 communicating with the through hole 140, 240. The slot 142, 242 extends from a top face of the arm 14, 24 to the through hole 140, 240 along a height of the arm 14, 24.

The third support 30 is placed between the first support 10 and the second support 20. The third support 30 also includes a chassis 32 and an arm 34 extending upwardly from the chassis 32. The arm 34 of the third support 30 is wider than the arms 14, 24 of the first support 10 and the second support 20. A groove 340 is defined in a top face of the arm 34 of the third support 30. A width of an upper portion of the groove 340 is constant, and a width of a lower portion of the groove 340 gradually decreases along a top-to-bottom direction of the arm 34. The groove 340 is used to receive the lens 60 therein for supporting the lens 60 on the third support 30. A pair of blocks 342 are formed in the groove 340. The blocks 342 are located facing each other. The two blocks 342 are used to abut against the light emergent face 64 of the lens 60 when the lens 60 is disposed in the groove 340, whereby the lens 60 is readily held in the groove 340 of the third support 30.

The first positioning element 40 includes a pole 42, a sleeve 44 and a head 46. The sleeve 44 surrounds a rear end of the pole 42. The sleeve 44 has an outer diameter smaller than a diameter of the through hole 140. The sleeve 44 is retained within the through hole 140 of the arm 14 to fix the pole 42 to the first support 10. The head 46 is detachably mounted to a front end of the pole 42. The head 46 is used to press the lens 60 to further position the lens 60 on the third support 30. The head 46 can be replaced by other types of heads according to different shapes of lenses to be measured. The head 46 includes a base portion 460, a connecting portion 462 and a probe portion 464. The base portion 460 of the head 46 is connected to the front end of the pole 42. The base portion 460 may be screwed into the front end of the pole 42 for realizing convenient attachment and detachment of the head 46 relative to the pole 42. The connecting portion 462 has a diameter gradually decreasing from the base portion 460 towards the probe portion 464. The connecting portion 462 has a shape similar to a cone. The probe portion 464 is formed on a front distal end of the connecting portion 462. In this embodiment, the probe portion 464 is a ball having a curvature radius less than that of the depression 66 of the light emergent face 64 of the lens 60. Thus, the probe portion 464 can contact a deepest position of the depression 66 successfully.

The second positioning element 50 has a configuration similar to that of the first positioning element 40. The second positioning element 50 also includes a pole 52, a sleeve 54 and a head 56. The pole 52 extends through the through hole 240 of the second support 20. The pole 52 is movable in the through hole 240 along front-to-rear or rear-to-front direction. The sleeve 54 surrounds a front end of the pole 52. The sleeve 54 has an outer diameter larger than a diameter of the through hole 240. The sleeve 54 is located in rear of the arm 24 of the second support 20 to limit the movement of the pole 52. The head 56 is detachably mounted to a rear end of the pole 52. The head 56 of the second positioning element 50 is used to press the lens 60 together with the head 46 of the first positioning element 40, thereby to obtain the thickness of the lens 60. The head 56 can be replaced by other types of heads according to different shapes of lenses to be measured. The head 56 includes a base portion 560, a connecting portion 562 and a probe portion 564. The base portion 560 of the head 56 is connected to the rear end of the pole 52. The base portion 560 may be screwed into the rear end of the pole 52 for realizing convenient attachment and detachment of the head 56 relative to the pole 52. The connecting portion 562 has a diameter gradually decreasing from the base portion 560 towards the probe portion 564. The connecting portion 562 has a shape similar to a cone. The probe portion 564 is formed on a rear distal end of the connecting portion 562. In this embodiment, the probe portion 564 is a ball having a curvature radius less than that of the light incident face 62 of the lens 60. Thus, the probe portion 564 can contact a deepest position of the light incident face 62 successfully.

The operating element 90 is fixed to the front end of the pole 52 of the second positioning element 50. The operating element 90 may be operated by an user to drive the second positioning element 50 to move frontward or rearward. The measuring element 80 is fixed to the operating element 90. The measuring element 80 can detect the moving distance of the operating element 90 or the second positioning element 50, thereby calculating the thickness of the lens 60.

In use of the apparatus, the lens 60 is firstly disposed in the groove 340 of the third support 30. The probe portion 46 of the first positioning element 40 simultaneously presses against the depression 66 of the light emergent face 64 of the lens 60 at the time when the lens 60 is disposed in the groove 340. The operating element 90 is then operated to drive the second positioning element 50 to move towards the lens 60 from an initial position. When the second positioning element 50 moves to a final position where the probe portion 564 presses against the light incident face 62 of the lens 60, the operation of the operating element 90 is stopped. The measuring element 80 calculates the thickness of the lens 60 according to a moving distance of the second positioning element 50 between the initial position and the final position. For example, a value of an initial distance (i.e., the distance between the two probe portions 464, 564 before movement of the second positioning element 50 towards the lens 60) between the two probe portions 464, 564 is stored in the measuring element 80. After measuring the moving distance of the second positioning element 50, the measuring element 80 obtain a result of the thickness of the lens 60 by using the initial distance minus the moving distance. Furthermore, the value of the thickness of the lens 60 may be shown on a screen 82 of the measuring element 80 for observation. As a result, the thickness of the lens 60 can be conveniently and rapidly obtained by using the apparatus.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An apparatus for measuring a thickness of a lens, comprising:
   a first support;
   a first positioning element fixed to the first support, the first positioning element comprising a probe portion for contacting a first face of the lens;
   a second support spaced from the first support;
   a second positioning element movably mounted to the second support, the second positioning element comprising a probe portion for contacting a second face of the lens, the second face of the lens for being opposite to the first face of the lens;
   a third support comprising a base and an arm extending from the base, the arm of the third support being configured for supporting the lens thereon, the arm of the third support defining a groove in a top end thereof and two blocks formed in the groove, the two blocks abutting against the first face of the lens; and
   a measuring element;
   wherein the first positioning element is configured for holding the lens in position by using the probe portion thereof to abut against the first face of the lens, the second positioning element is movable towards the lens from a first position away from the lens, to a second position where the probe portion of the second positioning element abuts against the second face of the lens, the measuring element configured for calculating the thickness of the lens according to a distance between the first position and the second position.

2. The apparatus of claim 1, wherein the probe portion of the first positioning element is spherical and has a curvature radius less than that of a contacted point of the first face of the lens, and the probe portion of the second positioning element is spherical and has a curvature radius less than that of a contacted point of the second face of the lens.

3. The apparatus of claim 1, wherein each of the first support and the second support comprises a chassis and an arm extending from the chassis, the arms of the first support and the second support defining through holes for extension of the first positioning element and the second positioning element, respectively.

4. The apparatus of claim 3, wherein each of the first support and the second support comprises a slot defined in a top end of the arm thereof and communicating with the through hole.

5. The apparatus of claim 3, wherein each of the first positioning element and the second positioning element comprises a pole extending through the through hole of each of the first support and the second support, and a head detachably mounted to the pole thereof.

6. The apparatus of claim 5, wherein the head of each of the first positioning element and the second positioning element comprises a base portion connected to an end of the pole of each of the first positioning element and the second positioning element, and a connecting portion connected to the base portion, the probe portion being formed on a distal end of the connecting portion.

7. The apparatus of claim 6, wherein the connecting portion has a diameter gradually decreasing from the base portion towards the probe portion.

8. The apparatus of claim 1, wherein the first support, the third support and the second support are arranged along a straight line.

9. The apparatus of claim 1 further comprising an operating element fixed to the second positioning element, wherein the measuring element is fixed to the operating element.

10. The apparatus of claim 9, wherein the measuring element comprises a display screen configured to display a value of the thickness of the lens.

11. A method for measuring a thickness of a lens, comprising:
    providing a first support with a first positioning element fixed to the first support, a second support with a second positioning element movably mounted to the second support, a third support located between the first support and the second support, the first support, the second support and the third support each comprising a chassis and an arm extending from the arm, the first positioning element extending through the arm of the first support, the second positioning element extending through the arm of the second support, and the lens being disposed on the arm of the third support, the arm of the third support defining a groove in a top end thereof and two blocks formed in the groove, the two blocks abutting against the first face of the lens;

disposing a lens on the third support so as to enable the first positioning element to abut against a first face of the lens;

moving the second positioning element towards the lens from a first position, to a second position where the second positioning element abuts against a second face of the lens opposite to the first face of the lens, calculating the thickness of the lens according to a distance between the first position and the second position.

12. The method of claim 11, wherein each of the first face and the second face of the lens comprises a concave part, the first positioning element and the second positioning element each comprising a probe portion to contact the corresponding concave part.

13. The method of claim 12, wherein the probe portion of the first positioning element is spherical and has a curvature radius less than that of the concave part of the first face of the lens, and the probe portion of the second positioning element is spherical and has a curvature radius less than that of the concave part of the second face of the lens.

14. The method of claim 12, wherein each of the first positioning element and the second positioning element comprises a pole and a head detachably mounted to the pole, the probe portion being a part of the head.

15. The method of claim 12, wherein the head of each of the first positioning element and the second positioning element comprises a base portion connected to the pole of each of the first positioning element and the second positioning element, and a connecting portion connecting the base portion with the probe portion, the connecting portion having a cone shape and the probe portion being formed on a sharp end of the connecting portion.

16. The method of claim 12, wherein the concave part of the first face of the lens is a light incident face of the lens, and the second face of the lens is a convex face with the concave part of the second face defined in a center of the convex face.

* * * * *